June 9, 1964   R. A. POTRUCH   3,136,515
HANGER FOR WIRES, CABLES AND THE LIKE
Filed June 19, 1962

INVENTOR.
ROBERT A. POTRUCH
BY Salvatore G. Militana
Patent attorney

United States Patent Office 3,136,515
Patented June 9, 1964

3,136,515
HANGER FOR WIRES, CABLES AND THE LIKE
Robert A. Potruch, Miami Beach, Fla., assignor to Lumidor Products Corporation, Hialeah, Fla., a corporation of Maryland
Filed June 19, 1962, Ser. No. 203,541
2 Claims. (Cl. 248—62)

This invention relates to supporting devices and is more particularly directed to hangers for wires, cables and the like.

A principal object of the present invention is to provide a hanger for wires, cables and the like that is readily mounted on a support bar and will receive a plurality of wires, cables and the like with ease and support same in a neat compact manner.

Another object of the present invention is to provide a plastic molded hanger which is both resilient and strong for supporting a plurality of wires, cables and the like.

Another object of the present invention is to provide a hanger for wires, cables and the like which is simple in construction, easy to mount on a support bar and very readily receives the wires and cables without any possibility of the cables or wires becoming loosened therefrom.

A still further object of the present invention is to provide a hanger for wires and cables which is supported at its mid-portion and receives a plurality of wires or cables on each side thereof.

With these and other objects in view, the invention will be best understood from a consideration of the following detailed description taken in connection with the accompanying drawing forming a part of this specification, with the understanding, however, that the invention is not confined to any strict conformity with the showing of the drawing but may be changed or modified so long as such changes or modifications mark no material departure from the salient features of the invention as expressed in the appended claims.

Figure 1:
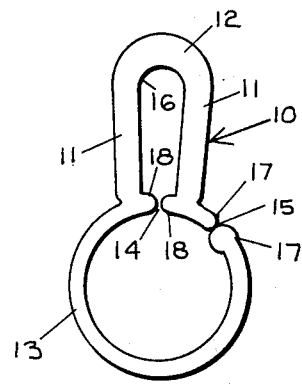
FIGURE 1 is a side elevational view of a hanger for wires, cables and the like constructed in accordance with my invention.
Figure 2:
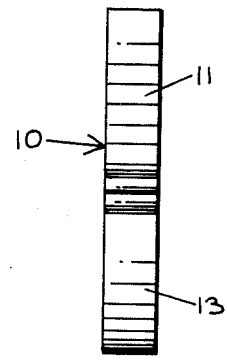
FIGURE 2 is a side elevational view thereof.
Figure 3:
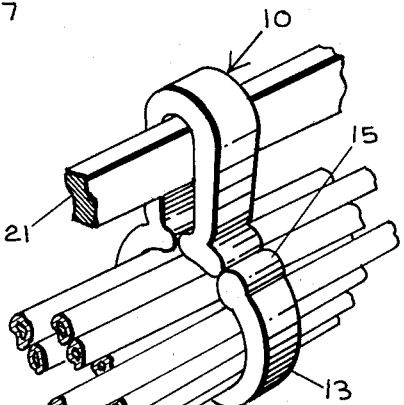
FIGURE 3 is a perspective view showing the manner of supporting wires.

Referring to the drawing wherein like numerals are used to designate similar parts throughout the several views, the numeral 10 refers to a hanger for wires, cables and the like that consist of a U-shaped body portion having leg portions 11 joined at one end by a web portion 12. The other end of the leg portions 11 are integrally molded to a substantially circular wire supporting band 13 which is provided with two slots or openings 14 and 15. The opening 14 is formed by finger portions 18 extending inwardly at the base of the leg portions 11, the finger portions 18 being a part of the band 13 between the leg portions 11 permitting access to the slot 16 which extends between the spaced apart leg portions 11. The slot 15 is positioned adjacent one of the leg portions 11 and permits access to the inner portion of the wire supporting band 13. One end of the band 13 forming the slot 15 is enlarged as at 17 to prevent wires or cables positioned within the band 13 from being able to inadvertently slip out through the slot 15. The enlarged end portion 17 forms an abutment against which wires 20 will impinge when the latter are positioned within the band 13 in proximity of the slot 15 and are prevented from slipping out of the device 10 through the slot 15.

In the normal use of the hangers 10 for supporting wires 20 having a support bar 21 for supporting the wires 20, the hangers 10 are spread apart at the slot 15. This is done by grasping the leg portions 11 with one hand and the lower portion of the band 13 with the other hand and then drawing the hands apart. The support bar 21 will now slide easily past the slot 15 and into the circular band 13. The lower ends of the leg portions 11 are now grasped and spread apart to permit the enlargement of the slot 14 and the bar 21 to slide upwardly into position in contact with the web portion 12. Inasmuch as the hangers 10 are made of a tough and resilient plastic when the force is applied on the hanger 10 to open the slots 14 and 15 has been relinquished, the various parts of the hangers 10 return to their normal positions and the slots 14 and 15 to their normal size.

With a plurality of hangers 10 mounted on the support bar 21 which spans the length along which the wires 20 are to be supported, the wires 20 are now inserted into the band 13 through the slot 15 and will be maintained in a compact group with little or no sag between the adjacent hangers 10. The wires 20 are held in the view of men working on them and accessible in the event connections have to be made to the wires.

Figure 4:
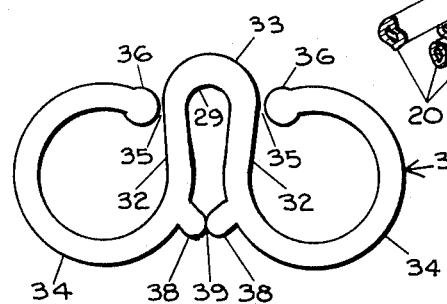
FIGURE 4 is a view similar to FIGURE 1 showing an alternate construction of my hanger for supporting two groups of wires or cables.
Figure 5:
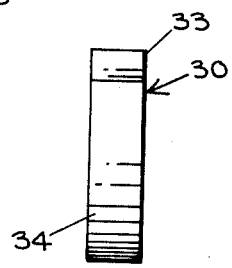
FIGURE 5 is a side elevational view thereof.
Figure 6:
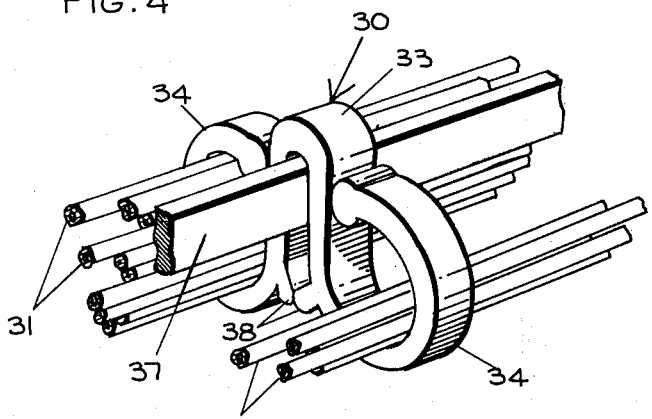
FIGURE 6 is a perspective view similar to that shown by FIGURE 3.

Now, referring to FIGURES 4-6 inclusive, an alternately constructed hanger 30 of my hanger 10 as shown which receives and hold only one single group of wires 20. The hanger 30 which is capable of supporting two groups of cables or wires 31 consists of a pair of leg portions 32 joined together at their top portion by a web portion 33 to form an enlarged slot 29. The lower ends of the leg portions 32 flare outwardly in a direction away from each other to form arcuate bands 34 which terminate in close proximity of the upper portion of the leg portions 32 forming a slot or opening 35. The end of each of the circular bands 34 is enlarged as at 36 to prevent wires or cables 31 positioned within the bands 34 from inadvertently slipping through the slot 55 and becoming free of the hanger 30. To assure that the hanger 30 will remain securely seated on a bar 37 when once placed therein, a pair of fingers 38 extend from the base of the leg portions 32 inwardly to form a slot 39 therebetween. The fingers 38 form a resilient barricade for the bar 37 permitting the bar 37 to pass through the slot 39 only when force has been applied on the fingers 38 to flex them in a direction away from each other.

The hanger 30 is mounted on the bar 37 by placing the hanger 30 on the bar 37 in close proximity to the fingers 38. The leg portions 32 are now grasped by each hand and spread apart causing the slot 39 to widen sufficiently to permit the bar 37 to slide therealong into the slot 29 between the leg portions 32. When released, the leg portions 32 and the fingers 38 return to their original position to contain the bar 37. Wires or cables 31 are now slipped past the slots 35 to be received in the enclosure of the bands 34. If a large wire or cable 37 is to be supported by the hanger 30, the upper end 36 of the circular band 34 is pulled away from the leg portion 32 and the slot 35 is opened sufficiently to permit the large wire to pass therealong. When released the enlarged end 36 of the band 34 will return to its original position adjacent the leg portion 32. The enlarged or bulbous end 36 of the band 34 prevents wires from inadvertently slipping out through the slot 35.

Having described my invention, what I claim as new and desire to secure by Letters Patent of the United States is:

1. A hanger for wires, cables and the like comprising a pair of leg portions positioned in spaced relation, a web portion joining said leg portions at one end, finger portions extending in a direction toward each other inwardly of said leg portions at the other end thereof forming a substantially enclosed slotted portion, an arcuate member mounted at said other end of each of said leg portions and terminating at a position adjacent said web portion of said hanger whereby a slot is formed between said leg portions and said arcuate members for receiving and containing said wires.

2. A hanger for wires, cables and the like comprising a pair of leg portions positioned in spaced relation, a web portion joining said leg portions at one end, finger portions extending in a direction toward each other inwardly of said leg portions at the other end thereof forming a substantially enclosed slotted portion, an arcuate member mounted at said other end of each of said leg portions and terminating at in substantially close proximity of said leg portions of said hanger whereby a slot is formed between said leg portions and said arcuate members for receiving and containing said wires, said terminal end of said arcuate members being enlarged to prevent the inadvertent slipping of wires past said slots.

References Cited in the file of this patent

UNITED STATES PATENTS

| | | |
|---|---|---|
| 714,718 | Locke | Dec. 12, 1902 |
| 1,164,613 | Jewell | Dec. 14, 1915 |
| 2,205,496 | Schneider | June 25, 1940 |
| 2,605,387 | Brodie | July 29, 1952 |
| 2,606,734 | Magnuson | Aug. 12, 1952 |
| 2,626,439 | Mack | Jan. 27, 1953 |
| 2,934,587 | Duffy | Apr. 26, 1960 |
| 3,074,675 | Brown | Jan. 22, 1963 |